(12) United States Patent
Okeda et al.

(10) Patent No.: US 12,331,140 B2
(45) Date of Patent: Jun. 17, 2025

(54) MODIFIED POLYOLEFIN RESIN AND USE THEREOF

(71) Applicant: NIPPON PAPER INDUSTRIES CO., LTD., Tokyo (JP)

(72) Inventors: Tomohiro Okeda, Tokyo (JP); Takato Takenaka, Tokyo (JP); Isamu Ono, Tokyo (JP); Minoru Yada, Tokyo (JP); Hiroko Iwakiri, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 248 days.

(21) Appl. No.: 18/005,170

(22) PCT Filed: Apr. 19, 2021

(86) PCT No.: PCT/JP2021/015924
§ 371 (c)(1),
(2) Date: Jan. 11, 2023

(87) PCT Pub. No.: WO2022/024476
PCT Pub. Date: Feb. 3, 2022

(65) Prior Publication Data
US 2023/0257492 A1  Aug. 17, 2023

(30) Foreign Application Priority Data

Jul. 27, 2020  (JP) ................. 2020-126169

(51) Int. Cl.
| | |
|---|---|
| *C08F 20/18* | (2006.01) |
| *B32B 15/085* | (2006.01) |
| *B32B 15/20* | (2006.01) |
| *B32B 27/32* | (2006.01) |
| *C08F 8/46* | (2006.01) |
| *C08F 255/02* | (2006.01) |
| *C09D 11/106* | (2014.01) |
| *C09D 151/06* | (2006.01) |

(52) U.S. Cl.
CPC ............ *C08F 20/18* (2013.01); *C08F 8/46* (2013.01); *C08F 255/02* (2013.01); *C09D 11/106* (2013.01); *C09D 151/06* (2013.01); *B32B 15/085* (2013.01); *B32B 15/20* (2013.01); *B32B 27/32* (2013.01); *B32B 2255/06* (2013.01); *B32B 2255/26* (2013.01)

(58) Field of Classification Search
None
See application file for complete search history.

(56) References Cited

U.S. PATENT DOCUMENTS

| | | | | |
|---|---|---|---|---|
| 6,372,359 B1 * | 4/2002 | Hayashi | ................. | C08L 23/08 |
| | | | | 428/518 |
| 2004/0059064 A1 * | 3/2004 | Usui | .................... | C08F 255/02 |
| | | | | 525/309 |

FOREIGN PATENT DOCUMENTS

| | | |
|---|---|---|
| CN | 108699178 A | 10/2018 |
| EP | 0 261 808 A2 | 3/1988 |
| JP | 60-58450 A | 4/1985 |
| JP | 63-54407 A | 3/1988 |
| JP | 2015096563 A | 5/2015 |
| JP | 2018150482 A | 9/2018 |
| JP | 2020037687 A | 3/2020 |
| WO | WO 2015080269 A1 | 6/2015 |
| WO | WO 2018/037849 A1 | 3/2018 |
| WO | WO 2019/188858 A1 | 10/2019 |
| WO | WO 2020031916 A1 | 2/2020 |

OTHER PUBLICATIONS

International Search Report issued Jun. 29, 2021 in PCT/JP2021/015924 filed Apr. 19, 2021, 2 pages.
Chinese Office Action issued Mar. 26, 2025 in Chinese Patent Application No. 202180050089.0 (with Machine Translation), 20 pages total.

* cited by examiner

*Primary Examiner* — John Vincent Lawler
(74) *Attorney, Agent, or Firm* — Oblon, McClelland, Maier & Neustadt, L.L.P.

(57) ABSTRACT

An object of the present invention is to provide a modified polyolefin resin composition having a high polyethylene content and exhibiting a good balance between a low-temperature stability and an adhesion to a polyethylene substrate and a metal. The present invention provides a modified polyolefin resin that is a graft-modified product in which a component (A) that is a polyolefin resin having an ethylene structural unit content of 50% or more by mole is modified with a component (B) that is an $\alpha,\beta$-unsaturated carboxylic acid or an anhydride thereof and a component (C) that is a (meth)acrylate ester represented by the following general formula (I), and an extrapolated melting end temperature (Tem) of the modified polyolefin resin measured in accordance with JIS K7121-1987 using a differential scanning calorimeter at a temperature raising rate of 10° C./minute is 58° C. or lower.

12 Claims, No Drawings

MODIFIED POLYOLEFIN RESIN AND USE THEREOF

FIELD

The present invention relates to a modified polyolefin resin and the use thereof.

BACKGROUND

A modified polyolefin resin having a content of a polyethylene therein increased has been developed for an adhesive use between a polyethylene substrate and a metal such as aluminum. For example, in Patent Literature 1, it is described that a modified polyolefin resin that is a graft-modified product and exhibits an excellent adhesion to a metal such as aluminum and a polyolefin substrate including a polyethylene substrate; the modified polyolefin resin being obtained by modifying a polyolefin resin, containing at least a first copolymer a having an ethylene structural unit content of less than 50% by mole and a second copolymer b having an ethylene structural unit content of 50% by mole or more, with an α,β-unsaturated carboxylic acid or with a derivative thereof.

CITATION LIST

Patent Literature

Patent Literature 1: International Patent Application Laid-open No. 2019/188858

SUMMARY

Technical Problem

However, in the resin described in Patent Literature 1, it is expected that an adhesion to a polyethylene substrate and a low-temperature stability may be further enhanced.

An object of the present invention is to provide a modified polyolefin resin composition having a high polyethylene content and exhibiting a good balance between a low-temperature stability and an adhesion to a polyethylene substrate and a metal.

Solution to Problem

The inventors of the present invention provide the following [1] to [12].

[1] A modified polyolefin resin, wherein the modified polyolefin resin is a graft-modified product in which a component (A) that is a polyolefin resin having an ethylene structural unit content of 50% or more by mole is modified with a component (B) that is an α,β-unsaturated carboxylic acid or an anhydride thereof and a component (C) that is a (meth)acrylate ester represented by a general formula (I):

$$CH_2=C(R^1)COOR^2 \qquad (I)$$

(in the general formula (I), $R^1$ represents a hydrogen atom or a methyl group, and $R^2$ represents a hydrocarbon group represented by $C_nH_{2n+1}$, where n represents an integer of 8 to 18), and an extrapolated melting end temperature (Tem) of the modified polyolefin resin measured in accordance with JIS K7121-1987 using a differential scanning calorimeter at a temperature raising rate of 10° C./minute is 58° C. or lower.

[2] The modified polyolefin resin according to [1], wherein a melting point of the modified polyolefin resin measured in accordance with JIS K7121-1987 using a differential scanning calorimeter at a temperature raising rate of 10° C./minute is 40° C. or lower.

[3] The modified polyolefin resin according to [2], wherein a difference between the extrapolated melting end temperature (Tem) and the melting point is 16° C. or more.

[4] The modified polyolefin resin according to any one of [1] to [3], wherein grafting weights of the component (B) and of the component (C) each in the modified polyolefin resin each are 0.1% to 20% by weight.

[5] The modified polyolefin resin according to any one of [1] to [4], wherein a weight-average molecular weight of the modified polyolefin resin is 1,000 to 300,000.

[6] A composition comprising the modified polyolefin resin according to any one of [1] to [5].

[7] The composition according to [6], wherein the composition is a resin solution, an aqueous dispersion, or a solid product.

[8] The composition according to [6] or [7], wherein the composition further comprises at least one component selected from the group consisting of a solvent, a curing agent, and an adhesive component.

[9] A primer comprising the modified polyolefin resin according to any one of [1] to [5] or the composition according to any one of [6] to [8].

[10] A paint binder comprising the modified polyolefin resin according to any one of [1] to [5] or the composition according to any one of [6] to [8].

[11] An ink binder comprising the modified polyolefin resin according to any one of [1] to [5] or the composition according to any one of [6] to [8].

[12] A laminate comprising:
a layer including either the modified polyolefin resin according to any one of [1] to [5] or the composition according to any one of [6] to [8];
a metal layer; and
a resin layer.

Advantageous Effects of Invention

According to the present invention, a modified polyolefin resin composition having a high polyethylene content and exhibiting superior properties both in an adhesion to a polyethylene substrate and a low-temperature stability can be provided.

DESCRIPTION OF EMBODIMENTS

[Modified Polyolefin Resin]

A modified polyolefin resin is a graft-modified product in which a component (A) is modified with a component (B) and a component (C).

(Component (A): Polyolefin Resin)

The polyolefin resin is usually a polymer containing an olefin (α-olefin) structural unit. In this specification, the olefin structural unit means the structural unit derived from an olefin (α-olefin). Illustrative examples of the α-olefin include ethylene, propylene, 1-butene, 1-pentene, 1-hexene, 1-heptene, 1-octene, styrene, and norbornene.

The polyolefin resin may be an olefin polymer containing one olefin structural unit alone or a copolymer of olefin polymers containing two or more olefin structural units. In the case where the polyolefin resin is the copolymer, the polyolefin resin may be a random copolymer or a block copolymer.

The polyolefin resin usually contains an ethylene structural unit. The content of the ethylene structural unit is usually 50% or more by mole, preferably 60% or more by mole, while more preferably 70% or more by mole. With this, a good adhesion to a substrate can be obtained. The upper limit thereof is usually 95% or less by mole, preferably 90% or less by mole, while more preferably 85% or less by mole. With this, a good solution stability can be obtained. The content of the ethylene structural unit may be a use ratio in the raw material or a value calculated from an NMR analysis. Both values usually coincide with each other.

Illustrative examples of the polyolefin resin include polyethylene, ethylene-propylene copolymer, ethylene-1-butene copolymer, and ethylene-propylene-1-butene copolymer; among these, ethylene-propylene copolymer is more preferable. In this specification, "polyethylene" represents the polymer whose basic unit is the ethylene structural unit.

The melting point (Tm) of the polyolefin resin is usually 35° C. or lower, preferably 30° C. or lower, while more preferably 28° C. or lower. The lower limit thereof is, for example, 10° C. or higher, or 20° C. or higher, but there is no particular restriction in it. The extrapolated melting end temperature (Tem) of the polyolefin resin is usually 62° C. or lower, preferably 60° C. or lower, while more preferably 58° C. or lower. The lower limit thereof is, for example, 10° C. or higher, 15° C. or higher, or 20° C. or higher. The difference between the extrapolated melting end temperature and the melting point of the polyolefin resin is usually 24° C. or more, preferably 25° C. or more, while more preferably 26° C. or more. The upper limit thereof is usually 50° C. or less, preferably 40° C. or less, while more preferably 30° C. or less.

In this specification, the extrapolated melting end temperature and the melting point of the resin may be measured using a differential scanning calorimeter in accordance with JIS K7121-1987 with the temperature raising rate of 10° C./minute.

The weight-average molecular weight of the polyolefin resin is preferably 200,000 or less, while more preferably 190,000 or less. The lower limit thereof is usually 10,000 or more, preferably 30,000 or more, while more preferably 50,000 or more. The weight-average molecular weight may be obtained from a calibration curve of the reference polystyrene by gel permeation chromatography (GPC).

The component (A) may be one polyolefin resin alone or a combination of a plurality of polyolefin resins.

(Component (B): α,β-Unsaturated Carboxylic Acid or Anhydride Thereof)

The α,β-unsaturated carboxylic acid or the anhydride thereof is usually an α,β-unsaturated carboxylic acid, a derivative and an anhydride thereof; here, illustrative examples thereof include maleic acid, maleic anhydride, fumaric acid, citraconic acid, citraconic anhydride, mesaconic acid, itaconic acid, itaconic anhydride, aconitic acid, aconitic anhydride, nadic anhydride, (meth)acrylic acid, and (meth)acrylate esters (excluding (meth)acrylate esters represented by the general formula (I)). From a viewpoint of grafting to the polyolefin resin, maleic anhydride is preferable.

The grafting weight of the component (B) is usually 0.1% or more by weight, preferably 0.2% or more by weight, while more preferably 0.3% or more by weight, relative to 100% by weight of the modified polyolefin resin. The upper limit thereof is usually 20% by weight, preferably 10% or less by weight, more preferably 7% or less by weight, still more preferably 5% or less by weight, while especially preferably 3% or less by weight. The grafting weight of the component (B) may be determined, for example, by an alkali titration method on the basis of the weight of the modified polyolefin resin.

The component (B) may be a single component selected from α,β-unsaturated carboxylic acids and the anhydrides thereof, or a combination of a plurality of them.

(Component (C): (Meth)acrylate Ester)

The (meth)acrylate ester has the structure represented by the general formula (I). The general formula (I) is as follows.

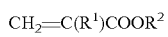

$$CH_2=C(R^1)COOR^2 \tag{I}$$

$R^1$ represents a hydrogen atom or a methyl group, and $R^2$ represents a hydrocarbon group represented by $C_nH_{2n+1}$. Here, n represents an integer of 8 to 18. The (meth)acrylate ester having the structure represented by the formula (I) is preferably lauryl (meth)acrylate, tridecyl (meth)acrylate, octyl (meth)acrylate, or isodecyl (meth)acrylate; here, more preferable are lauryl methacrylate, octyl methacrylate, tridecyl methacrylate, and isodecyl (meth)acrylate.

The grafting weight of the component (C) is usually 0.1% or more by weight, preferably 0.3% or more by weight, while more preferably 0.5% or more by weight, relative to 100% by weight of the modified polyolefin resin. The upper limit thereof is usually 20% by weight, preferably 10% or less by weight, more preferably 7% or less by weight, still more preferably 5% or less by weight, while especially preferably 3% or less by weight. The grafting weight of the component (C) may be determined, for example, by $^1$H-NMR, on the basis of the weight of the modified polyolefin resin.

(Graft Modification)

Modification of the component (A) with the components (B) and (C) may be done, for example, with a method in which the components (B) and (C) are grafted to the component (A) (introduction by graft copolymerization). There is no particular restriction in the condition for graft copolymerization; so, this may be done with a known method such as a melting method and a solution method. In the case of the melting method, the operation is simple and the reaction time is short. In the case of the solution method, a uniform graft polymerization product may be obtained with less side reactions.

In the case of the melting method, for example, a polyolefin is caused to react by heating and melting (heating and fusing) in the presence of a radical reaction initiator. The temperature of the heating and melting is preferably in the range of the melting point or higher to 300° C. or lower. Equipment such as a Banbury mixer, a kneader, and an extruder may be used for the heating and melting. In the solution method, for example, a polyolefin is dissolved in an organic solvent and then heated and stirred in the presence of a radical reaction initiator to cause the reaction. Aromatic solvents such as toluene and xylene are preferably used as the organic solvent. The temperature during the reaction is preferably in the range of 100° C. or higher to 180° C. or lower. Illustrative examples of the radical reaction initiator to be used in the melting method and in the solution method include an organic peroxide compound and an azonitrile. Illustrative examples of the organic peroxide compound include di-tert-butyl peroxide, dicumyl peroxide, tert-butyl-cumyl peroxide, benzoyl peroxide, dilauryl peroxide, 2,5-dimethyl-2,5-di(tert-butylperoxy)hexane, cumene hydroperoxide, tert-butyl hydroperoxide, 1,1-bis(tert-butylperoxy)-3,5,5-trimethylcyclohexane, 1,1-bis(tert-butylperoxy)-cyclohexane, cyclohexanone peroxide, tert-butyl peroxybenzoate, tert-butyl peroxyisobutyrate, tert-butylperoxy-3,5,5-trimethyl hexanoate, tert-butylperoxy-2-ethyl hexanoate, tert-butylperoxyisopropyl carbonate, and cumyl peroxyoctoate. Illustrative examples of the azonitrile include 2,2-azobis(2-methylbutyronitrile), 2,2-azobisisobutyronitrile, 2,2-azobis(2,4-dimethylvaleronitrile), and 2,2-azobis (4-methoxy-2,4-dimethylvaleronitrile).

(Extrapolated Melting End Temperature (Tem))

The extrapolated melting end temperature of the modified polyolefin resin is usually 58° C. or lower, preferably 57° C. or lower, more preferably 56° C. or lower, while still more preferably 55° C. or lower. The lower limit thereof is usually 10° C. or higher, preferably 20° C. or higher, while more preferably 30° C. or higher.

(Melting Point (Tm))

The melting point of the modified polyolefin resin is usually 40° C. or lower, preferably 38° C. or lower, while still more preferably 35° C. or lower. The lower limit thereof is usually 10° C. or higher, preferably 15° C. or higher, while more preferably 20° C. or higher. When the melting point of the modified polyolefin resin is 40° C. or lower, the melting state of the modified polyolefin resin can be readily maintained at low temperatures, resulting in the excellent low-temperature stability of the solution. When the melting point is 10° C. or higher, blocking of the modified pellets can be suppressed.

(Difference Between Extrapolated Melting End Temperature and Melting Point)

The difference between the extrapolated melting end temperature and the melting point of the modified polyolefin resin is usually 16° C. or more, preferably 17° C. or more, more preferably 18° C. or more, while still more preferably 19° C. or more. The upper limit thereof is usually 50° C. or less, preferably 45° C. or less, more preferably 40° C. or less, while still more preferably 35° C. or less. The larger the difference between the extrapolated melting end temperature and the melting point, the greater the amount of endothermic heat to melt and the harder to be crystallized, resulting in enhancement of the solution stability.

(Weight-Average Molecular Weight)

The weight-average molecular weight of the modified polyolefin resin is preferably 200,000 or less, more preferably 180,000 or less, while still more preferably 150,000 or less. The lower limit thereof is usually 10,000 or more, preferably 30,000 or more, while more preferably 50,000 or more. The weight-average molecular weight may be obtained from a calibration curve of the reference polystyrene by gel permeation chromatography (GPC).

The modified polyolefin resin can be used as a solid product as it is after the solvent is removed. In this specification, the solid product means substantially free from a liquid component such as the solvent. This can be produced by removing the solvent; then, this may be further molded into a desired shape as needed. Illustrative examples of the molding method include the method using equipment such as an extruder and a water-cooling type pelletizer.

[Modified Polyolefin Resin Composition]

The modified polyolefin resin may also be used as a composition in combination with other components. The modified polyolefin resin composition may be used in various embodiments. There is no particular restriction in embodiment of the modified polyolefin resin composition; so, this may include, for example, a resin solution, an aqueous dispersion, and a solid product, in which the embodiment may be chosen as appropriate in accordance with the use thereof. It is preferable that the modified polyolefin resin composition be a resin solution or an aqueous dispersion.

(Other Components)

Other components include, for example, a polymer having the component (B) and the components (C) as the composition unit, a monomer of the component (B) or of the component (C), and a resin component such as an unmodified polyolefin resin. These have already been described. Also, illustrative examples of the other component include a solvent, a curing agent, an adhesive component, a stabilizer, a basic substance, an emulsifier, a crosslinking agent, a diluent, an antioxidant, a light stabilizer, a UV absorber, a pigment, a dye, and an inorganic filler; from these, any component may be chosen in accordance with the use thereof. Among these, preferable is at least one or more selected from a solvent, a curing agent, and an adhesive component.

—Solvent—

The solvent may be either an organic solvent or an aqueous solvent. Illustrative examples of the organic solvent include aromatic hydrocarbon solvents such as toluene and xylene; ester solvents such as methyl acetate, ethyl acetate, n-propyl acetate, isopropyl acetate, and butyl acetate; ketone solvents such as acetone, methyl ethyl ketone, and methyl butyl ketone; alicyclic hydrocarbon solvents such as cyclohexane, methylcyclohexane, and ethylcyclohexane; aliphatic hydrocarbon solvents such as nonane and decane. Illustrative examples of the aqueous solvent include water; glycol solvents such as ethylene glycol, ethyl cellosolve, and butyl cellosolve; aliphatic alcohol solvents such as methanol, ethanol, n-propyl alcohol, isopropyl alcohol, n-butyl alcohol, isobutyl alcohol, sec-butyl alcohol, tert-butyl alcohol, and 2-ethyl-hexanol; glycol monoether solvents such as propyleneglycol monomethyl ether, propyleneglycol monoethyl ether, propyleneglycol monopropyl ether, propyleneglycol monoisopropyl ether, and propyleneglycol monobutyl ether. These solvents may be used singly or included as a mixture solvent of two or more of them in the resin composition. From an environmental viewpoint, it is preferable to choose the solvent except for the aromatic hydrocarbon solvents; so, more preferable is a mixed solvent of an alicyclic hydrocarbon solvent with an ester solvent or with a ketone solvent.

—Curing Agent—

Illustrative examples of the curing agent include a polyisocyanate compound, an epoxy compound, a polyamine compound, a polyol compound, a crosslinking agent whose functional group is blocked by a protective group, and a combination of two or more of these. The content of the curing agent may be determined as appropriate in accordance with the content of the modified polyolefin resin. When using the curing agent, a catalyst such as an organotin compound or a tertiary amine compound may be used together with the curing agent in accordance with the purpose.

—Adhesive Component—

Illustrative examples of the adhesive component include known adhesive components such as a polyester adhesive, a polyurethane adhesive, and an acrylic adhesive.

—Stabilizer—

Illustrative examples of the stabilizer include those compounds containing an epoxy ring, such as an epoxy stabilizer. Illustrative examples of the epoxy stabilizer include epoxy compounds having an epoxy equivalent of about 100 to about 500 and containing one or more epoxy groups in one molecule. More specifically, examples thereof include: an epoxidized soybean oil and an epoxidized linseed oil, these been obtained by epoxidizing a vegetable oil having a natural unsaturated group with a peracetic acid or other peracids; epoxidized fatty acid esters obtained by epoxidizing a unsaturated fatty acid such as oleic acid, a tall oil fatty acid, or a soybean oil fatty acid; epoxidized alicyclic compounds such as an epoxidized tetrahydrophthalate; condensation products of bisphenol A or a polyvalent alcohol with epichlorohydrin, such as bisphenol A glycidyl ether, ethyleneglycol glycidyl ether, propyleneglycol glycidyl ether, glycerol polyglycidyl ether, and sorbitol polyglycidyl ether; and monoepoxy compounds such as butyl glycidyl ether, 2-ethylhexyl glycidyl ether, decyl glycidyl ether, stearyl glycidyl ether, allyl glycidyl ether, phenyl glycidyl ether, sec-butyl phenyl glycidyl ether, tert-butyl phenyl glycidyl ether, and phenol polyethylene oxide glycidyl ether. The stabilizer may also be a compound not containing the epoxy ring; here, illustrative examples thereof include metal soaps such as calcium stearate and lead stearate; organometallic compounds such as dibutyl tin dilaurate and dibutyl malate; and a hydrotalcite compound; these being used as the stabilizer for a polyvinyl chloride resin.

The stabilizer not containing an epoxy ring may also be used; here, illustrative examples thereof include metal soaps such as calcium stearate and lead stearate; organometallic compounds such as dibutyl tin dilaurate and dibutyl malate; and a hydrotalcite compound; these being used as the stabilizer for a polyvinyl chloride resin.

The content of the stabilizer is preferably 0.1% or more by weight, more preferably 1% or more by weight, while more preferably 2% or more by weight, relative to 100% by weight of the modified polyolefin resin. With this, a good stabilizing effect can be expressed. The upper limit thereof is preferably 15% or less by weight, more preferably 12% or less by weight, while still more preferably 10% or less by weight. With this, a good adhesion to the substrate such as a polyolefin can be expressed.

—Basic Substance—

When for example, water, an alcohol solvent, a glycol solvent, a ketone solvent, or an ester solvent is used as the solvent, it is preferable that the composition include a basic substance. With this, pH can be properly controlled, so that the dispersion of the resin into the solvent and the storage stability of the composition can be enhanced furthermore. Illustrative examples of the basic substance include sodium hydroxide, potassium hydroxide, ammonia, methylamine, propylamine, hexylamine, octylamine, ethanolamine, propanolamine, diethanolamine, N-methyldiethanolamine, dimethylamine, diethylamine, triethylamine, N,N-dimethylethanolamine, 2-dimethylamino-2-methyl-1-propanol, 2-amino-2-methyl-1-propanol, morpholine, dimethylethanolamine, and 2-amino-2-ethyl-1,3-propanediol; among these, preferable are ammonia, triethylamine, 2-amino-2-methyl-1-propanol, morpholine, dimethylethanolamine, and 2-amino-2-ethyl-1,3-propanediol. The basic substance may be one basic substance alone or a combination of two or more of them. The content of the basic substance may be controlled arbitrarily in accordance with the amount of the acidic component in the modified polyolefin resin. The amount thereof is controlled such that the pH of the modified polyolefin resin composition may become usually 5 or higher, while preferably 6 or higher. With this, sufficient neutralization can be ensured, resulting in the stable dispersion. The upper limit thereof is the amount that can bring the pH to 10 or lower. With this, compatibility with other components and safety in operation may be properly ensured.

—Diluent—

In the case when an organic solvent is used as the solvent, it is preferable that the composition contain a diluent. With this, the storage stability can be enhanced. Illustrative examples of the diluent include an alcohol and a propyleneglycol ether. Illustrative examples of the alcohol include methanol, ethanol, propanol, isopropanol (2-propanol), and butanol. Illustrative examples of the propyleneglycol ether include propyleneglycol methyl ether, propyleneglycol ethyl ether, and propyleneglycol tert-butyl ether.

—Crosslinking Agent—

When the aqueous solvent is used as the solvent, it is preferable that the composition contain a crosslinking agent. The crosslinking agent can be any as long as the agent can react with a group such as a hydroxyl group, a carboxyl group, or an amino group present in the composition to form a crosslinked structure; so, this can be any of a water-soluble crosslinking agent and a water dispersion of the crosslinking agent (crosslinking agent that is in the dispersed state in water in one way or another). Illustrative examples of the crosslinking agent include a blocked isocyanate compound, an aliphatic or aromatic epoxy compound, an amine compound, and an amino resin. The component (H) may be one crosslinking agent alone or a combination of two or more of the crosslinking agents. There is no particular restriction in the method for adding the crosslinking agent; so, the timing of the addition can be either during or after the aqueous process.

—Emulsifier—

In the case when the aqueous solvent is used as the solvent, it is preferable that the composition contain an emulsifier. Illustrative examples of the emulsifier include surfactants such as a nonionic surfactant and an anionic surfactant; among these, a nonionic surfactant is preferable.

Illustrative examples of the nonionic surfactant include a polyoxyethylene alkyl ether, a polyoxyethylene polyoxypropylene alkyl ether, a polyoxyethylene derivative, a polyoxyethylene fatty acid ester, a polyoxyethylene polyol fatty acid ester, a polyoxyethylene polyoxypropylene polyol, a sorbitan fatty acid ester, a polyoxyethylene hardened castor oil, a polyoxyalkylene polycyclic phenyl ether, a polyoxyethylene alkylamine, an alkyl alkanolamide, and a polyalkyleneglycol (meth)acrylate. Among these, preferable are a polyoxyethylene alkyl ether, a polyoxyethylene fatty acid ester, polyoxyethylene sorbitan fatty acid ester, and a polyoxyethylene alkylamine.

Illustrative examples of the anionic surfactant include an alkyl sulfate salt, a polyoxyethylene alkyl ether sulfate salt, an alkylbenzenesulfonate salt, an α-olefin sulfonate salt, a methyltaurylate salt, a sulfosuccinate salt, an ether sulfonate salt, an ether carboxylate salt, a fatty acid salt, a naphthalene sulfonic acid formalin condensate, an alkylamine salt, a quaternary ammonium salt, an alkyl betaine, and an alkylamine oxide. Preferable are a polyoxyethylene alkyl ether sulfate salt and a sulfosuccinate salt.

(Resin Solution)

The resin solution can be, for example, a solution obtained by mixing the modified polyolefin resin, the organic solvent as described above, and optionally the component other than the organic solvent described above.

(Solid Product)

The solid product can be, for example, the modified polyolefin resin, which is optionally mixed with other component described above.

(Aqueous Dispersion)

The aqueous dispersion contains the emulsifier described above, together with the modified polyolefin resin and the aqueous solvent (including an aqueous dispersing medium such as water). In the case of the aqueous dispersion of the modified polyolefin resin, the particle size of the resin component can be controlled such that the dispersion can be stabilized thereby enabling to enhance the performance relating to the stability such as a moisture resistance.

In the aqueous dispersion, the content of the emulsifier is preferably 30% or less by weight, more preferably 20% or less by weight, while still more preferably 10% or less by weight. The lower limit thereof is not particularly restricted; so, it is not necessary to include the emulsifier. When the content of the emulsifier is less than 20% by weight, the deterioration in the adhesion property due to addition of the emulsifier may be suppressed.

The aqueous dispersion preferably contains a modified polyolefin resin, an aqueous dispersing medium such as water, an emulsifier, and optionally at least one component selected from the group consisting of an organic solvent, an emulsification assisting agent, a curing agent, and an adhesive component.

Illustrative examples of the organic solvent for the aqueous dispersion include aromatic hydrocarbon solvents such as toluene and xylene; ester solvents such as ethyl acetate and butyl acetate; ketone solvents such as methyl ethyl ketone, methyl butyl ketone, and ethyl cyclohexanone; alicyclic hydrocarbon solvents such as cyclohexane and methylcyclohexane; and aliphatic hydrocarbon solvents such as nonane and decane. From an environmental viewpoint, organic solvents other than aromatic hydrocarbon solvents are preferable, while a mixed solvent of an alicyclic hydrocarbon solvent with an ester solvent or with a ketone solvent is more preferable. The organic solvent may be used one solvent alone or as a mixture of two or more of these solvents.

As for the emulsifier, for example, the compound represented by the following general formula (II) and having the molecular weight of less than 200 is preferable.

$$R\text{—}O\text{—}(C_bH_{2b}O)_cH \quad (II)$$

In general the formula (II), R represents $C_aH_{2a+1}$, where a is an integer of 1 or more to 10 or less. And, a is preferably an integer of 8 or less, more preferably an integer of 7 or less, still more preferably an integer of 6 or less, further still more preferably an integer of 5 or less, while especially preferably an integer of 4 or less.

In the general formula (II), b is an integer of 1 or more to 5 or less, preferably an integer of 4 or less, while more preferably an integer of 3 or less. The lower limit of b is not particularly restricted, although 2 or more is preferable.

In the general formula (II), c is an integer of 1 or more to 5 or less, preferably an integer of 4 or less, more preferably an integer of 3 or less, still more preferably an integer of 2 or less, while further still more preferably 1.

The compound represented by the general formula (II) and having the molecular weight of less than 200 is preferably a glycol ether type compound. The glycol ether type compound has a structure in which one hydrogen atom in the hydroxy group of the glycol such as ethylene glycol, propylene glycol, and butylene glycol is replaced by an alkyl group.

The compound represented by the general formula (II) has a hydrophobic group and a hydrophilic group in one molecule. Because of this, addition of the compound represented by the general formula (II) can readily disperse or emulsify the modified polyolefin resin in water. Because of this, the aqueous dispersion that keeps the good storage stability can be obtained.

More specifically, illustrative examples of the compound represented by the general formula (II) include ethyleneglycol monomethyl ether, ethyleneglycol monoethyl ether, ethyleneglycol monopropyl ether, ethyleneglycol monoisopropyl ether, ethyleneglycol monobutyl ether, ethyleneglycol monoisobutyl ether, ethyleneglycol mono-t-butyl ether, ethyleneglycol monohexyl ether, ethyleneglycol monodecyl ether, propyleneglycol monomethyl ether, propyleneglycol monoethyl ether, propyleneglycol monopropyl ether, and propyleneglycol monobutyl ether. Among these, ethyleneglycol monoethyl ether, ethyleneglycol monobutyl ether, ethyleneglycol mono-t-butyl ether, propyleneglycol monomethyl ether, and propyleneglycol monopropyl ether are preferable.

The molecular weight of the compound represented by the general formula (II) is less than 200. With this, the increase in the boiling point of the aqueous dispersion can be suppressed. As a result, a high temperature drying or a prolonged drying of the coating film can be omitted after having been coated with the aqueous dispersion or with a primer or the like containing the aqueous dispersion.

The molecular weight of the compound represented by the general formula (II) is the molecular weight obtained from the relative atomic mass as approved by the IUPAC Atomic Weight Commission (based on 12C=12).

The compound represented by the general formula (II) and having the molecular weight of less than 200 may be either a compound represented by the general formula (II) alone or a combination of two or more compounds represented by the general formula (II). In the latter case, the ratio of these compounds is not particularly restricted.

An alcohol (e.g., methanol, ethanol, propanol, isopropyl alcohol, and butanol) may be used as the emulsification assisting agent instead of the compound represented by the general formula (II), or may be used in combination with the compound represented by the general formula (II). The alcohol may be used one alcohol alone or as a mixture of two or more of these alcohols.

The emulsification assisting agent may be added with the amount of 1 to 20% by mass to the organic solvent.

The average particle diameter of the modified polyolefin resin in the aqueous dispersion is preferably 10 nm or greater, more preferably 20 nm or greater, while still more preferably 30 nm or greater. On the other hand, the upper limit thereof is preferably 250 nm or less, more preferably 230 nm or less, while still more preferably 210 nm or less. The average particle diameter represents the degree of dispersion, in which the smaller value indicates better dispersion. The average particle diameter is the Z-average particle diameter measured by a dynamic light scattering method. An example of the measurement instrument thereof may be Zetasizer Nano ZS manufactured by Malvern Panalytical, Inc.

[Production Method of Modified Polyolefin Resin Composition]

The production method of the modified polyolefin resin composition may be selected as appropriate in accordance with the embodiment of the composition.

(Production Method of Resin Solution)

Examples of the production method of the resin solutions include the method in which the modified polyolefin resin (after the solvent is removed) is added into a proper organic solvent. When the solvent remains in the reaction system during the production of the modified polyolefin resin, this solvent may be replaced with a proper organic solvent. The resin solution may be produced, when necessary, by stirring a mixture containing the modified polyolefin resin and the organic solvent. Stirring may be done, for example, by a single stirrer using equipment such as a stirrer blade, a disperser, a homogenizer, a sand mill, or a multi-axis extruder, or by combined stirring using two or more of the above equipment.

(Production Method of Solid Product)

The solid product may be produced by blending the modified polyolefin resin with other components when necessary, and then, this may be molded into a desired shape by the molding method described above when necessary.

(Production Method of Aqueous Dispersion)

Examples of the production method of the aqueous dispersion include the method in which the modified polyolefin resin and the other component to be optionally used are added into the reaction system all at once or in sequence. Examples of the method of sequential addition include the method in which after an organic solvent is added to and kneaded with the modified polyolefin resin, a basic substance to be optionally used and the emulsifier are added in sequence, and then the organic solvent is removed (for example, under reduced pressure). A series of the reactions are carried out preferably at high temperature (for example, 70° C. or higher, while preferably 80° C. or higher). After removal of the organic solvent, the product may be subjected to a stirring process using a stirrer such as a stirring blade, a disperser, a homogenizer, a sand mill, or a multi-axis extruder. With this, the particle diameter of the resin component in the aqueous dispersion can be controlled.

[Use of Modified Polyolefin Resin and Composition]

The modified polyolefin resin and the composition thereof have excellent adhesion between non-polar resins such as polyolefin substrates and between a non-polar resin and a metal; thus, they can be used in various uses such as a primer, an adhesive, a paint binder, and an ink binder.

The modified polyolefin resin and the composition thereof may be used as the material for the layer that constitutes a laminate. The laminate can include a layer containing the modified polyolefin resin or the composition thereof, a metal layer, and a resin layer. Illustrative examples of the metal include aluminum, aluminum alloy, nickel, and stainless steel. Illustrative examples of the resin include nonpolar resins such as polyolefin resins (for example, polyethylene resins such as a low-density polyethylene resin, a linear low-density polyethylene resin, and a high-density polyethylene resin; and polypropylene resins such as non-stretch polypropylene resin), a polyurethane resin, a polyamide resin, an acrylic resin, and a polyester resin. The arrangement of the layers in the laminate is not particularly limited; illustrative examples of the embodiment thereof include an embodiment in which a layer containing the modified polyolefin resin or the composition is sandwiched between a metal layer and a resin layer, and an embodiment in which a first resin layer and a second resin layer exist between metal layers, and a layer containing the modified polyolefin resin composition is sandwiched between the metal layer and each of the resin layers. Examples of the use of the laminate include a refill pouch for toiletries.

EXAMPLES

Hereinafter, the present invention will be specifically described by means of Examples. The following Examples are intended to properly illustrate the present invention and are not intended to limit the present invention. The measurement methods for physical properties and so forth are those as described below, unless otherwise specifically noted. The "part" indicates part by mass. In the description below, the temperature condition is of normal temperature (25° C.) unless otherwise specifically noted, and the pressure condition is of normal pressure (1 atm) unless otherwise specifically noted.

[Extrapolated Melting End Temperature (Tem) (° C.)]

After a sample of about 5 mg was weighed from a film having the thickness of 100 μm formed by heat pressing, this was placed in a DSC measurement instrument (DISCOVERY DSC2500 manufactured by TA Instruments, Inc.); and then, after the sample was heated to 150° C. and held at this temperature for 5 minutes, this was cooled down to −50° C. at the rate of 10° C./minute. Next, after the sample was held for 10 minutes, the temperature thereof was raised to 200° C. at the rate of 10° C./minute for measurement. So, the DSC curve was obtained by raising the temperature from −10° to 170° C. In accordance with JIS-K7121-1987, the temperature at the intersection between the line extended from the baseline on the high temperature side of the DSC curve to the low temperature side and the tangent line drawn at the point of the maximum slope to the curve in the high temperature side of the melting peak was regarded as the extrapolated melting end temperature (° C.).

[Melting Point (° C.)]

In accordance with JIS K7121-1987, by using the DSC measurement instrument (DISCOVERY DSC2500, manufactured by TA Instruments, Inc.), after about 5 mg of a sample prepared in the same way as the Tem measurement sample was held under a heated and melted state at 200° C. for 10 minutes, this was cooled at the rate of 10° C./minutes, and then stably held at −50° C. Next, the temperature thereof was raised to 200° C. at the rate of 10° C./minute to measure the melting peak temperature at the time of melting; so, this temperature was evaluated as the melting point (° C.).

[Weight-Average Molecular Weight]

This value was measured under the following conditions.

Measurement instrument: HLC-8320GPC (manufactured by Tosoh Corp.)

Eluent: tetrahydrofuran

Column: TSKgel (manufactured by Tosoh Corp.)

[Structural Unit Content (% by Mole)]

The structural unit content of each monomer was determined from the monomer composition ratio used in the polymerization. When the monomer composition ratio used in the polymerization was unknown, this was measured using a nuclear magnetic resonance (NMR) instrument, as described below. About 60 mg of the sample was dissolved in tetrachloroethane (d2), then, the $^{13}$C-NMR spectrum thereof was measured under the following conditions; the structural unit content was calculated from the integrated values of the chain methylene carbon signals.

Observation range: 250 ppm

Measurement mode: Single-pulse proton decoupling

Pulse angle: 5.25 microseconds (45°)

Repetition time: 5.5 seconds

Measurement temperature: 120° C.

[Grafting Weight of (Meth)acrylate Ester (° by Weight)]

This was measured by $^1$H-NMR.

[Grafting Weight of α,β-Unsaturated Carboxylic Acid or Derivative Thereof (% by Weight)]

This was measured by an alkali titration method.

[Average Particle Diameter]

The average particle diameter (nm) of the aqueous dispersion obtained in Example 6 was measured by a dynamic light scattering method using a "Zetasizer" manufactured by Malvern Panalytical, Inc.

[Heat Seal Strength Test (AL/LDPE, AL/L-LDPE, AL/HDPE) (gf/15 min)]

For the heat seal strength test, a solution sample with the concentration of 15% by weight of the modified polyolefin resin was prepared using methylcyclohexane/methyl ethyl ketone=8/2 (w/w); then, the solution sample was applied to aluminum foil using a #16 Myer bar so as to give the resin film having the thickness of 3 μm after drying. The resulting coated aluminum foil was laminated by a thermal compression bonding to each film of a linear low-density polyethylene (hereinafter referred to as "L-LDPE"), a low-density polyethylene (hereinafter referred to as "LDPE"), and a high-density polyethylene (hereinafter referred to as "HDPE"), with the laminating temperature of 70° C. at 200 kPa for 10 seconds; then, the test piece was cut out to the width of 15 mm to prepare a test specimen. After the test specimen was kept under the constant conditions at 23° C. and the relative humidity of 50% for 24 hours, the laminate adhesion strength was measured under the conditions of 180-degree peeling and peeling rate of 100 mm/minute.

[Heat Seal Strength Test (AL/CPP) (gf/15 min)]

A solution sample with the concentration of 15% by weight of the modified polyolefin resin, prepared using methylcyclohexane/methyl ethyl ketone=8/2 (w/w), was applied to aluminum foil using a #16 Myer bar so as to give the resin film having the thickness of 3 μm after drying; and then, this was dried at 180° C. for 10 seconds. The resulting coated aluminum foil was laminated by a thermal compression bonding to a non-stretched polypropylene (CPP) sheet with the laminating temperature of 140° C. at 200 kPa for 3 seconds; and then, the test piece was cut out to the width of 15 mm to prepare a test specimen. After the test specimen was kept under the constant conditions at 23° C. and the relative humidity of 50% for 24 hours, the laminate adhesion strength was measured under the conditions of 180-degree peeling and peeling rate of 100 mm/minute.

When the strength is 300 gf/15 mm, it can be judged that the adhesion is within the acceptable range.

[Low-Temperature Stability]

After the solution sample was put in a sealed glass bottle and kept at 5° C. for 30 days, the evaluation was conducted visually from the appearance thereof.

A: The fluidity of the composition solution is maintained.
B: The flowability of the composition solution is slightly deteriorated, but practically there is no problem.
C: The flowability of the composition solution is deteriorated.

The physical properties of the copolymer a, the copolymer b, the copolymer c, the copolymer d, and the copolymer e used in Examples 1 to 6 and Comparative Examples 1 to 3, which are going to be described later, are listed in Table 1 below.

Example 1: Production of Modified Polyolefin Resin

Into 400 g of toluene in a four-neck flask equipped with a stirrer, a cooling tube, and a dropping funnel was dissolved 100 parts (60 g) of the copolymer a (ethylene-propylene copolymer (ethylene component of 75° by mole, propylene component of 25° by mole, weight-average molecular weight of 144,000, melting point (Tm) of 27° C.)) by heating; and then, into the resulting solution were added dropwise 0.5 parts of maleic anhydride, 1.0 part of lauryl methacrylate, and 0.3 parts of Perhexa 25B (2,5-dimethyl-2,5-di(tert-butylperoxy)hexane) over 3 hours while stirring and keeping the temperature of the system at 110° C.; and then, the reaction was continued for another 1 hour.

After completion of the reaction, the reaction solution was cooled to room temperature, and then, this was purified by pouring into a large excess of acetone to obtain the modified polyolefin resin having the extrapolated melting end temperature of 54.6° C., the melting point of 24.6° C., the weight-average molecular weight of 128,000, the grafted maleic anhydride of 0.3° by weight, and the grafted lauryl methacrylate of 0.8° by weight.

Example 2: Production of Modified Polyolefin Resin

Into 400 g of toluene in a four-neck flask equipped with a stirrer, a cooling tube, and a dropping funnel was dissolved 100 parts (60 g) of the copolymer a (ethylene-propylene copolymer (ethylene component of 75% by mole, propylene component of 25% by mole, weight-average molecular weight of 144,000, melting point (Tm) of 27° C.)) by heating; and then, into the resulting solution were added dropwise 4.0 parts of maleic anhydride, 1.0 parts of lauryl methacrylate, and 0.3 parts of Perhexa 25B (2,5-dimethyl-2,5-di(tert-butylperoxy)hexane) over 3 hours while stirring and keeping the temperature of the system at 110° C.; and then, the reaction was further continued for another 1 hour.

After completion of the reaction, the reaction solution was cooled to room temperature, and then, this was purified by pouring into a large excess of acetone to obtain the modified polyolefin resin having the extrapolated melting end temperature of 53.4° C., the melting point of 33.6° C., the weight-average molecular weight of 115,000, the grafted maleic anhydride of 2.5% by weight, and the grafted lauryl methacrylate of 0.8% by weight.

TABLE 1

| Copolymer | Resin composition | Extrapolated melting end temperature (° C.) | Melting point (° C.) | Extrapolated melting end temperature – Melting point (° C.) | Molecular weight (×10,000) |
|---|---|---|---|---|---|
| a | Ethylene (75%)-propylene copolymer | 55.0 | 26.8 | 28.2 | 14.4 |
| b | Ethylene (80%)-propylene copolymer | 63.0 | 37.9 | 25.1 | 12.6 |
| c | Ethylene (80%)-propylene copolymer | 63.3 | 39.3 | 24.0 | 13.6 |
| d | Ethylene (70%)-1-butene copolymer | 67.2 | 53.9 | 13.3 | 8.0 |
| e | Ethylene (75%)-propylene copolymer | 54.3 | 27.7 | 26.6 | 18.2 |

Example 3: Production of Modified Polyolefin Resin

Into 400 g of toluene in a four-neck flask equipped with a stirrer, a cooling tube, and a dropping funnel was dissolved 100 parts (60 g) of the copolymer a (ethylene-propylene copolymer (ethylene component of 75% by mole, propylene component of 25% by mole, weight-average molecular weight of 144,000, melting point (Tm) of 27° C.)) by heating; and then, into the resulting solution were added dropwise 4.0 parts of maleic anhydride, 4.5 parts of lauryl methacrylate, and 0.3 parts of Perhexa 25B (2,5-dimethyl-2,5-di(tert-butylperoxy)hexane) over 3 hours while stirring and keeping the temperature of the system at 110° C.; and then, the reaction was further continued for another 1 hour.

After completion of the reaction, the reaction solution was cooled to room temperature, and then, this was purified by pouring into a large excess of acetone to obtain the modified polyolefin resin having the extrapolated melting end temperature of 54.1° C., the melting point of 34.4° C., the weight-average molecular weight of 131,000, the grafted maleic anhydride of 1.7% by weight, and the grafted lauryl methacrylate of 2.8% by weight.

Example 4: Production of Modified Polyolefin Resin

Into 400 g of toluene in a four-neck flask equipped with a stirrer, a cooling tube, and a dropping funnel was dissolved 100 parts (60 g) of the copolymer e (ethylene-propylene copolymer (ethylene component of 75% by mole, propylene component of 25% by mole, weight-average molecular weight of 182,000, melting point (Tm) of 28° C.)) by heating; and then, into the resulting solution were added dropwise 0.5 parts of maleic anhydride, 1.0 part of lauryl methacrylate, and 0.3 parts of Perhexa 25B (2,5-dimethyl-2,5-di(tert-butylperoxy)hexane) over 3 hours while stirring and keeping the temperature of the system at 110° C.; and then, the reaction was continued for another 1 hour.

After completion of the reaction, the reaction solution was cooled to room temperature, and then, this was purified by pouring into a large excess of acetone to obtain the modified polyolefin resin having the extrapolated melting end temperature of 54.1° C., the melting point of 22.3° C., the weight-average molecular weight of 103,000, the grafted maleic anhydride of 0.3% by weight, and the grafted lauryl methacrylate of 0.8% by weight.

Example 5: Production of Modified Polyolefin Resin

Into 400 g of toluene in a four-neck flask equipped with a stirrer, a cooling tube, and a dropping funnel was dissolved 100 parts (60 g) of the copolymer a (ethylene-propylene copolymer (ethylene component of 75% by mole, propylene component of 25% by mole, weight-average molecular weight of 144,000, melting point (Tm) of 27° C.)) by heating; and then, into the resulting solution were added dropwise 0.5 parts of maleic anhydride, 1.0 parts of lauryl acrylate, and 0.3 parts of Perbutyl D (di-tert-butylperoxide) over 3 hours while stirring and keeping the temperature of the system at 110° C.; and then, the reaction was continued for another 1 hour.

After completion of the reaction, the reaction solution was cooled to room temperature, and then, this was purified by pouring into a large excess of acetone to obtain the modified polyolefin resin having the extrapolated melting end temperature of 54.7° C., the melting point of 26.3° C., the weight-average molecular weight of 88,000, the grafted maleic anhydride of 0.3% by weight, and the grafted lauryl acrylate of 0.8% by weight.

Example 6: Production of Aqueous Dispersion of Modified Polyolefin Resin

Into a four-neck flask equipped with a stirrer, a cooling tube, a dropping funnel, and a thermometer were added 100 g of the modified polyolefin resin obtained in Example 2, 10 g of the surfactant Emulgen 420 (polyoxyethylene oleyl ether, manufactured by Kao Corp), 80 g of methylcyclohexane, and 45 g of ethyleneglycol monobutyl ether; then, the resulting mixture was kneaded at an inner temperature of 95° C. for 60 minutes. Then, after 8 g of 2-amino-2-ethyl-1,3-propanediol was added, they were kneaded for 30 minutes, and then, 405 g of deionized water warmed to 90° C. was added over 90 minutes. Subsequently, after a portion of methylcyclohexane and ethyleneglycol monobutyl ether was removed under reduced pressure, the remaining mixture was cooled to room temperature with stirring; then, the aqueous modified polyolefin resin dispersion having the particle diameter of 150 nm was obtained by adjusting the solid product content so as to be 30% by weight with deionized water.

Comparative Example 1: Production of Modified Polyolefin Resin

Into 400 g of toluene in a four-neck flask equipped with a stirrer, a cooling tube, and a dropping funnel was dissolved 100 parts (60 g) of the copolymer b (ethylene-propylene copolymer (ethylene component of 80% by mole, propylene component of 20% by mole, weight-average molecular weight of 126,000, melting point (Tm) of 38° C.)) by heating; and then, into the resulting solution were added dropwise 0.5 parts of maleic anhydride, 1.0 part of lauryl methacrylate, and 0.3 parts of Perhexa 25B (2,5-dimethyl-2,5-di(tert-butylperoxy)hexane) over 3 hours while stirring and keeping the temperature of the system at 110° C.; and then, the reaction was continued for another 1 hour.

After completion of the reaction, the reaction solution was cooled to room temperature, and then, this was purified by pouring into a large excess of acetone to obtain the modified polyolefin resin having the extrapolated melting end temperature of 63.1° C., the melting point of 48.7° C., the weight-average molecular weight of 135,000, the grafted maleic anhydride of 0.4% by weight, and the grafted lauryl methacrylate of 0.8% by weight.

Comparative Example 2: Production of Modified Polyolefin Resin

Into 400 g of toluene in a four-neck flask equipped with a stirrer, a cooling tube, and a dropping funnel was dissolved 100 parts (60 g) of the copolymer c (ethylene-propylene copolymer (ethylene component of 80% by mole, propylene component of 20% by mole, weight-average molecular weight of 136,000, melting point (Tm) of 39° C.)) by heating; and then, into the resulting solution were added dropwise 0.5 parts of maleic anhydride, 1.0 part of lauryl methacrylate, and 0.3 parts of Perhexa 25B (2,5-dimethyl-2,5-di(tert-butylperoxy)hexane) over 3 hours while stirring and keeping the temperature of the system at 110° C.; and then, the reaction was continued for another 1 hour.

After completion of the reaction, the reaction solution was cooled to room temperature, and then, this was purified by pouring into a large excess of acetone to obtain the modified polyolefin resin having the extrapolated melting end temperature of 60.6° C., the melting point of 47.6° C., the weight-average molecular weight of 142,000, the grafted maleic anhydride of 0.3% by weight, and the grafted lauryl methacrylate of 0.8% by weight.

Comparative Example 3: Production of Modified Polyolefin Resin

Into 400 g of toluene in a four-neck flask equipped with a stirrer, a cooling tube, and a dropping funnel was dissolved 100 parts (60 g) of the copolymer d (ethylene-1-butene copolymer (ethylene component of 70% by mole, 1-butene component of 30° by mole, weight-average molecular weight of 80,000, melting point (Tm) of 54° C.)) by heating; and then, into the resulting solution were added dropwise 0.5 parts of maleic anhydride, 0.375 part of lauryl methacrylate, and 0.3 parts of Perhexa 25B (2,5-dimethyl-2,5-di(tert-butylperoxy)hexane) over 3 hours while stirring and keeping the temperature of the system at 110° C.; and then, the reaction was continued for another 1 hour.

After completion of the reaction, the reaction solution was cooled to room temperature, and then, this was purified by pouring into a large excess of acetone to obtain the modified polyolefin resin having the extrapolated melting end temperature of 70.0° C., the melting point of 57.8° C., the weight-average molecular weight of 79,000, the grafted maleic anhydride of 0.3% by weight, and the grafted lauryl methacrylate of 0.2% by weight.

Table 2 lists the physical properties of the modified polyolefin resins prepared in Examples 1 to 6 and Comparative Examples 1 to 3.

TABLE 2

| | Copolymer | Grafting weight of α,β-unsaturated carboxylic acid (% by weight) | Grafting weight of (meth)acrylate ester (% by weight) | Extrapolated melting end temperature (° C.) | Melting point (° C.) | Extrapolated melting end temperature - Melting point (° C.) | Molecular weight (×10,000) |
|---|---|---|---|---|---|---|---|
| Example 1 | a | 0.3 | 0.8 | 54.6 | 24.6 | 30.0 | 12.8 |
| Example 2 | a | 2.5 | 0.8 | 53.4 | 33.6 | 19.8 | 11.5 |
| Example 3 | a | 1.7 | 2.8 | 54.1 | 34.4 | 19.7 | 13.1 |
| Example 4 | e | 0.3 | 0.8 | 54.1 | 22.3 | 31.8 | 10.3 |
| Example 5 | a | 0.3 | 0.8 | 54.7 | 26.3 | 28.4 | 8.8 |
| Example 6 | a | 2.5 | 0.8 | 53.4 | 33.6 | 19.8 | 11.5 |
| Comparative Example 1 | b | 0.4 | 0.8 | 63.1 | 48.7 | 14.4 | 13.5 |
| Comparative Example 2 | c | 0.3 | 0.8 | 60.6 | 47.6 | 13.0 | 14.2 |
| Comparative Example 3 | d | 0.3 | 0.2 | 70.0 | 57.8 | 12.2 | 7.9 |

The results of heat seal strength tests of the modified polyolefin resins prepared in Examples 1 to 6 and Comparative Examples 1 to 3 with the aluminum foil and various polyethylene films, as well as the results of the low-temperature storage stability tests of the solutions are summarized in Table 3.

TABLE 3

| | Peel strength (gf/15 mm) | | | | Low-temperature stability |
|---|---|---|---|---|---|
| | AL/LDPE | AL/L-LDPE | AL/HDPE | AL/CPP | 5° C., 30 days |
| Example 1 | 647 | 692 | 658 | 1152 | A |
| Example 2 | 451 | 767 | 326 | 920 | A |
| Example 3 | 492 | 554 | 382 | 1013 | A |
| Example 4 | 827 | 704 | 949 | 1071 | A |
| Example 5 | 847 | 673 | 878 | 878 | A |
| Example 6 | 315 | 535 | 220 | 653 | A |
| Comparative Example 1 | 745 | 782 | 801 | 935 | C |
| Comparative Example 2 | 719 | 731 | 737 | 1111 | C |
| Comparative Example 3 | 384 | 736 | 497 | 1005 | C |

As can be clearly seen in Tables 2 and 3, as compared to the modified polyolefin resins of Comparative Examples 1 to 3, the modified polyolefin resins of Examples 1 to 6 had higher low-temperature stability and exhibited no problems in adhesion to the aluminum foil and the various polyethylenes; so, both the properties were in good balance. These results indicate that the modified polyolefin resins of the present invention can have a good balance between the low-temperature stability and the adhesion to the polyethylene substrates and the metal.

The invention claimed is:

1. A modified polyolefin resin, wherein the modified polyolefin resin is a graft-modified product grafted body in which a component (A) that is a polyolefin resin having an ethylene structural unit content of 50% or more by mole is modified with a component (B) that is an α,β-unsaturated carboxylic acid or an anhydride thereof and a component (C) that is a (meth)acrylate ester represented by a general formula (I):

where in the general formula (I), $R^1$ represents a hydrogen atom or a methyl group, and $R^2$ represents a hydrocarbon group represented by $C_nH_{2n+1}$, where n represents an integer of 8 to 18;

an extrapolated melting end temperature (Tem) of the modified polyolefin resin measured in accordance with JIS K7121-1987 using a differential scanning calorimeter at a temperature raising rate of 10° C./minute is 58° C. or lower; and a melting point of the polyolefin resin having an ethylene structural unit content of 50% or more by mole measured in accordance with JIS K7121-1987 using a differential scanning calorimeter at a temperature raising rate of 10° C./minute is 35° C. or lower.

2. The modified polyolefin resin according to claim 1, wherein a melting point of the modified polyolefin resin measured in accordance with JIS K7121-1987 using a differential scanning calorimeter at a temperature raising rate of 10° C./minute is 40° C. or lower.

3. The modified polyolefin resin according to claim 2, wherein a difference between the extrapolated melting end temperature (Tem) and the melting point is 16° C. or more.

4. The modified polyolefin resin according to claim 1, wherein grafting weights of the component (B) and of the component (C) each in the modified polyolefin resin each are 0.1% to 20% by weight.

5. The modified polyolefin resin according to claim 1, wherein a weight-average molecular weight of the modified polyolefin resin is 1,000 to 300,000.

6. A composition comprising the modified polyolefin resin according to claim 1.

7. The composition according to claim 6, wherein the composition is a resin solution, an aqueous dispersion, or a solid product.

8. The composition according to claim 6, wherein the composition further comprises at least one component selected from the group consisting of a solvent, a curing agent, and an adhesive component.

9. A primer comprising the modified polyolefin resin according to claim 1.

10. A paint binder comprising the modified polyolefin resin according to claim 1.

11. An ink binder comprising the modified polyolefin resin according to claim 1.

12. A laminate comprising:
a layer including either the modified polyolefin resin according to claim 1;
a metal layer; and
a resin layer.

* * * * *